Sept. 11, 1956  H. F. FAUGHT  2,762,559
AXIAL FLOW COMPRESSOR WITH AXIALLY ADJUSTABLE ROTOR
Filed Sept. 23, 1954
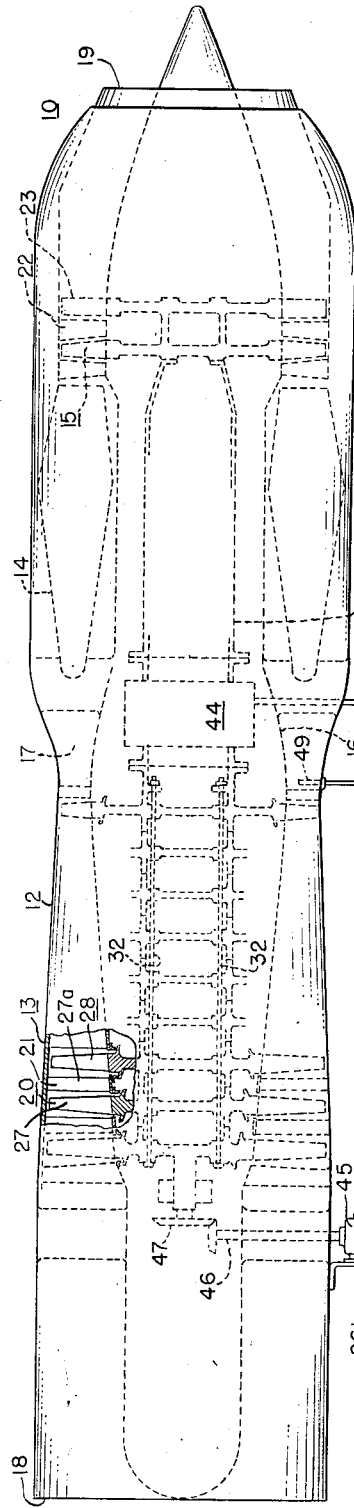
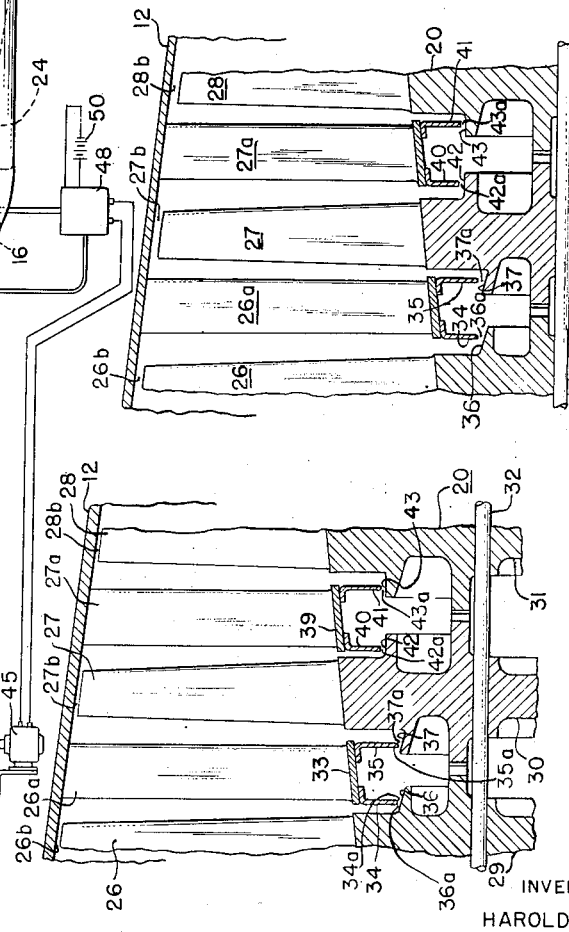
INVENTOR
HAROLD F. FAUGHT
BY
*Ralph T. French*
ATTORNEY United States Patent Office 2,762,559
Patented Sept. 11, 1956

2,762,559

AXIAL FLOW COMPRESSOR WITH AXIALLY ADJUSTABLE ROTOR

Harold F. Faught, Westwood, Kans., assignor to Westinghouse Electric Corporation, East Pittsburgh, Pa., a corporation of Pennsylvania Application September 23, 1954, Serial No. 457,977

5 Claims. (Cl. 230—114)

This invention relates to axial flow compressors, more particularly to multi-stage axial flow compressors operable at speeds ranging from low to high, and has for an object to provide improved apparatus of this type.

Although not limited to gas turbine power plants, the invention is highly advantageous when incorporated in the compressor portion thereof, since gas turbine power plants, especially aviation gas turbine power plants, must perform properly within a wide range of rotor speeds. Usually the compressor portion of an aviation gas turbine power plant is designed for high R. P. M. At high R. P. M. values, the ratio of air outlet pressure to air inlet pressure is high (for example, on the order of six), while at idling R. P. M. the ratio of air outlet pressure to air inlet pressure is considerably lower (for example, on the order of two).

As generally understood in the art, a compressor of the above type, although sufficiently stable at the design pressure ratio values, becomes unstable at low pressure ratio values with resultant blade vibration and surging leading to possible blade failure, or at best, to poor acceleration characteristics. To overcome these difficulties, various solutions have heretofore been proposed, such as compressor air bleeding arrangements, multi-compressor rotors and variable pitch stator blade arrangements.

It is another object to provide, in an axial flow compressor, an improved arrangement for avoiding blade vibration and surging in the pressure stages at pressure ratio values substantially less than the pressure ratio value for which the compressor is designed.

A further object is to provide, in a compressor of the above type, an arrangement in which the rotor blade tip clearances and/or the stator blade tip clearances are modified in accordance with an operating condition of the compressor.

A more specific object is to provide an arrangement wherein the compressor blade tip and seal clearances are increased at referred rotor R. P. M. values lower than the referred design R. P. M. values.

Briefly, the invention resides in providing a multi-stage compressor with a rotor which is axially movable relative to the stator and providing a stator blade sealing ring arrangement in which the clearance may be increased by movement of the rotor in the direction toward the air inlet. In addition, the rotor blade tip seals may also be arranged to increase the clearance by the above-mentioned rotor movement. Means are further provided, responsive to an operating condition of the compressor, such as R. P. M., temperature, pressure ratio, or any combination of these conditions for positioning the rotor for optimum performance. When the invention is practiced in a gas turbine power plant, the compressor rotor positioning means may be disposed intermediate the compressor rotor shaft and the turbine rotor shaft.

The above and other objects are effected by the invention as will be apparent from the following description taken in connection with the accompanying drawing, forming a part of this application, in which:

Fig. 1 is a longitudinal diagrammatic view of an aviation gas turbine power plant having the invention incorporated therein with portions of the compressor shown in section;

Fig. 2 is a greatly enlarged view of the portion shown in section in Fig. 1 and illustrating one operative position of the compressor;

Fig. 3 is a view similar to Fig. 2 but showing the compressor in another operative position; and Fig. 4 is a view similar to Fig. 2 but illustrating another embodiment.

Referring to the drawing in detail, especially Fig. 1, there is shown an aviation gas turbine power plant, generally designated 10, of somewhat conventional type and having the invention incorporated therein. The plant is of the turbo-jet type and has an outer tubular casing 12 within which are disposed a compressor 13, combustion apparatus 14 and a turbine 15, in axial alignment with one another. Tubular core structure 16 is further provided, forming with the casing 12 an annular passageway 17 communicating with an air inlet 18 and an exhaust outlet 19. The compressor 13 is provided with a bladed rotor 20 and a bladed stator assembly 21 cooperating therewith to provide a plurality of pressure stages. The turbine 15 is also provided with a bladed stator 22 and a bladed rotor 23 which is connected to the compressor rotor 20 by means of an axially-extending shaft 24.

In operation, air is drawn into the inlet 18 to the compressor 13 where it is pressurized in a series of stages by rotation of the rotor 20 and is then directed downstream to the fuel combustion apparatus 14 where it is heated and combined with fuel admitted thereto (by means not shown) to provide hot motive gases for driving the turbine 15 and then ejected through the exhaust outlet 19 in the form of a propulsive jet.

As well understood in the art, the turbine rotor 23 drives the compressor rotor 20 by means of the connecting shaft 24, so that the R. P. M. of the compressor rotor is always the same as that of the turbine rotor. In flight, depending upon the will of the pilot and other considerations, the R. P. M. of the compressor rotor 20 may vary widely from idling speed to military rated speed.

It is conventional practice to design the plant 10 for military thrust values. Accordingly, the compressor 13 is designed to operate efficiently and safely at military thrust and R. P. M. values of the plant. At military thrust values, the ratio of air outlet pressure to air inlet pressure is high, for example, on the order of 6, whereas, at idling thrust the air outlet pressure to air inlet pressure ratio is relatively lower, for example, on the order of 2. With such a wide range of operating conditions, efficiency and surge pressure ratio of the compressor at low pressure ratio values is considerably lower than at the high pressure ratio values for which the apparatus is designed, and surging within the stages with consequent blade damage may result. In addition thereto, acceleration from idling thrust values to military thrust values is not as rapid as desirable because of the above-mentioned surging.

In accordance with the invention, as best shown in Fig. 2, the compressor rotor 20 is provided with a series of annular blade rows of which blade rows 26, 27 and 28 are representative. Cooperating with the rotor blade rows 26, 27 and 28, is a plurality of stationary stator blade rows 26a and 27a. As well known in the art, the rotor blade row 26 and the stator blade row 26a cooperate to form a pressure stage and the rotor blade row 27 and the adjacent stator blade row 27a cooperate to form a succeeding and higher pressure stage. The outer casing 12 is so shaped that it diverges in the direction of the air inlet 18, so that a large mass of air at low pressure values is drawn into the casing and, upon becoming pressurized through the successive pressure stages mentioned above, it is reduced in volume.

To reduce leakage at the rotor blade rows 26, 27 and 28, the blade tips thereof are extended sufficiently in radially outward direction so that only small clearance spaces 26b, 27b and 28b are provided between the blade tips and the casing 12 when the rotor is operating at the design point. The compressor rotor 20 may comprise a plurality of stacked discs, of which discs 29, 30 and 31 are representative. The discs are held in interlocked engagement by a plurality of bolts 32 and support the rotor blades.

Similarly, it is desirable to maintain the clearance between the stator blade rows and the rotor to a small value. The stator blade row 26a is provided with an annular shroud member 33 at its radially inward end. Annular seal ring members 34 and 35, attached to the shroud 33, extend radially inwardly and cooperate with annular sealing surfaces 36 and 37 formed on adjacent faces of discs 29 and 30, respectively.

The sealing surfaces 36 and 37 are tapered radially inwardly in the direction of air flow through the stages and define generally conical surfaces, while the seal rings 34 and 35 extend radially inwardly in such a manner that their inner edges 34a and 35a lie on the same radius and together with the sealing surfaces 36 and 37 define clearance spaces 36a and 37a, respectively, of equal width.

The stator blade row 27a is provided with an annular shroud member 39 having seal ring members 40 and 41 extending radially inwardly therefrom and cooperating with annular sealing surfaces 42 and 43 formed on the adjacent faces of discs 30 and 31, respectively. The sealing surfaces 42 and 43 are cylindrical in shape and of the same radius, so that together with the seal ring members 40 and 41 they define annular clearance spaces 42a and 43a of the same width.

It will be understood that the above description of the sealing members is merely by way of example and that the various pressure stages of the compressor may be provided with a number of sealing ararngements of the first mentioned type and the second mentioned type or conceivably they may all be made according to the first type described.

Between the rotors 20 and 23 there is provided a mechanism generally indicated 44 for shifting the rotor 20 in axial direction. Since the shifting mechanism 44 per se is not a part of the invention, it need not be described in detail and has been shown in outline. However, it must be understood that it may be either electrically or mechanically operated and acts in such a manner that the rotor 20 may be shifted while still maintained in driving engagement with the driving shaft 24.

Means for sensing R. P. M. of the rotor 20, for example a tachometer generator 45, is driven by power take-off means 46, 47 connected to the rotor 20 for furnishing an R. P. M. signal to a control box 48 which in turn operates the rotor shifting mechanism 44. In addition thereto, temperature responsive means 49 disposed adjacent the compressor outlet may be provided for furnishing a temperature signal to the control box 48, and an electrical power supply 50 may be utilized for motivating the rotor shifting mechanism 44 in response to R. P. M. and outlet temperature of the compressor.

In operation, the position of the rotor 20 relative to the stator 21 is as shown in Fig. 2 when the plant is operated at design values, that is military thrust and R. P. M. However, in accordance with the invention, when the R. P. M. values and, accordingly, the thrust values of the plant are reduced, the control box 48 senses the reduced R. P. M. value transmitted by the generator 45 and the reduced temperature value sensed by the temperature sensing device 49 to actuate the rotor shifting mechanism 44 in a direction to move the rotor 20 axially to the left, as viewed in Fig. 1, i. e. toward the air inlet 18. This condition is shown in Fig. 3. It will be noted that due to the shifting of the rotor 20 relative to the stator 21, the sealing surfaces 36 and 37 are moved to the left, presenting portions of smaller diameter to the seal ring members 34 and 35, thereby causing the clearance spaces 36a and 37a to increase in width concurrently therewith. The blade tip clearances 26b, 27b and 28b are also increased in width because of the divergence of the casing 12. The increase in clearances 36a, 37a, 26b and 27b is sufficient to cause more air to leak past the stages than at the design conditions. For example, these clearances may vary from $\frac{1}{32}$ inch to $\frac{1}{8}$ inch. With increased leakage, surging in the otherwise affected stages is considerably reduced and vibration of the blades is similarly reduced. Because of the reduced vibration and surge phenomena, the rotor 20 is free to accelerate more rapidly should the pilot require a rapid increase in thrust of the plant.

It will be noted that when the rotor 20 is shifted axially toward the left, the sealing surfaces 42 and 43 are also moved axially to the left. However, since their surfaces are cylindrical, such shifting is accomplished with no change in width of clearance spaces 42a and 43a with the result that leakage in this portion of the compressor is not varied.

In actual practice, various combinations of the above sealing arrangements may be utilized. For example, the variable type seals may be utilized where it is desirable to relieve the stages at lower than design values. At other stages where it is not desirable to relieve the stages, the seals may be of the constant width type described above. Usually, it will be found that the variable space-sealing arrangements are advantageous in the low pressure stages and are not needed in the high pressure stages.

In Fig. 4, there is shown a modified stator sealing arrangement. The rotor 120 is provided with a plurality of stacked discs 129, 130 and 131, which individually support a series of rotor blades 126, 127 and 128, which cooperate with stator blade rows 126a and 127a to form two stages of the compressor. In this arrangement, the stator blade row 126 is provided with an inner shroud ring 133 having attached thereto annular seal ring members 134 and 135 extending radially inwardly and having axially extending tips 134a and 135a cooperating with sealing surfaces 136 and 137 formed on adjacent faces of discs 129 and 130, respectively. The seal ring portions 134a and 135a together with the disc faces 136 and 137 form annular clearance spaces 136a and 137a, respectively.

In operation, movement of the rotor 120 relative to the stator 121 results in change in width of the spaces 136a and 137a in somewhat the same manner as the sealing arrangement shown in Fig. 2. Since the rotor 120 may be shifted by apparatus of the same type as shown in connection with Fig. 1, it has not been shown and need not be described. Here also, as mentioned in connection with the first embodiment, the variable sealing arrangement may be provided on those stages where it is desired. On other stages, for example across diaphragm 127a, the seal rings 140 and 141 may be formed in the same manner as shown in Fig. 2 and arranged to cooperate with sealing surfaces 142 and 143 formed on the adjacent faces of discs 130 and 131 so that movement of the rotor does not effect the width of the spaces 142a and 143a.

It will now be seen that the invention provides a unique arrangement for avoiding surging and blade damage at values lower than the design values and in which the affected stages are relieved, thereby permitting rapid acceleration from low R. P. M. values to high R. P. M. values.

Although, in the embodiments shown, the invention has been described in connection with the R. P. M. sensing means 45 and the temperature sensing means 49, which together provide a referred R. P. M. signal, expressed $$\frac{R.\ P.\ M.}{\sqrt{T}}$$

to the control box 48, it will be understood that any other condition or set of conditions may be utilized in conjunction with the rotor shifting mechanism 44.

The invention also provides other advantages than those heretofore discussed. Although the spacing at the seals has been mentioned by way of example as varying from $\frac{1}{32}$ of an inch at high pressure ratio values to $\frac{1}{8}$ of an inch at low pressure ratio values, it will be understood that these values serve merely as examples and that other values may be attained if desired, should the invention be practiced in apparatus having a wider range of pressure ratio values than those mentioned heretofore.

Since surging is also minimized, the blading structure may be made lighter which is a definite advantage, especially in aircraft engines.

Although the invention has been shown in connection with several embodiments, it will be obvious to those skilled in the art that it is not so limited, but is susceptible of various other changes and modifications without departing from the spirit thereof.

What is claimed is:

1. An axial flow compressor comprising a rotor having a plurality of annular rows of blades, a stator having a plurality of annular rows of stationary blades cooperating with said rotor blades and forming therewith a plurality of pressure stages including a low pressure stage and a higher pressure stage, means cooperating with the blades in said low pressure stage for providing an annular clearance space between said rotor and said stator, said rotor being movable in axial direction relative to said stator to vary the width of said clearance space, and means responsive to an operating condition of the compressor for adjusting the axial position of said rotor.

2. An axial flow compressor comprising a rotor having a plurality of annular rows of blades and a stator having a plurality of annular rows of stationary blades cooperating with said rotor blades to form a plurality of pressure stages, at least one of said rotor blade rows being movable in axial direction relative to a cooperating stator blade row, and means responsive to an operating condition of the compressor for adjusting the axial position of said movable rotor blade row relative to said cooperating stator blade row.

3. The structure recited in claim 2 and further including an outer tubular casing for the rotor and stator, said casing providing a fluid inlet and a fluid outlet and having a portion diverging in a direction toward said inlet, the outer tips of the axially movable row of rotor blades being spaced radially inwardly from said diverging casing portion, whereby when the axially movable rotor blade row is moved by the condition responsive means, the radial width of said spaces is modified.

4. The structure recited in claim 2 in which the rotor is provided with a circular peripheral portion for supporting the axially movable rotor blade row, and in which the inner tips of the stationary blade row adjacent the axially movable rotor blade row are provided with an annular seal member disposed in closely spaced relation to said peripheral rotor portion, said seal member and said peripheral rotor portion being so arranged relative to each other that when the movable rotor blade row is moved in axial direction said spacing is modified.

5. A multi-stage axial flow compressor comprising a tubular casing providing a fluid inlet at one end, a rotor disposed within said casing and having a plurality of fixed annular rows of blades, a plurality of annular rows of stator blades attached to said casing and cooperating with said rotor blades to form a plurality of pressure stages, said rotor blades having outer tip portions disposed in closely spaced relation to said casing, said stator blades having inner end portions provided with annular seal members disposed in closely spaced relation to said rotor, said rotor being movable in axial direction, and means responsive to an operating condition of the compressor for adjusting the axial position of said rotor; said casing, said seal members and said rotor being so arranged that when said rotor is moved axially toward said inlet, the rotor blade tip spacing of at least one of said rotor blade rows and the stator blade end spacing of at least one of said stator blade rows is increased.

References Cited in the file of this patent

UNITED STATES PATENTS

| 2,630,678 | Pratt | Mar. 10, 1953 |
| 2,650,017 | Pedersen et al. | Aug. 25, 1953 |
| 2,689,680 | Lovesey | Sept. 21, 1954 |